(12) United States Patent
Chiao et al.

(10) Patent No.: US 11,378,539 B2
(45) Date of Patent: Jul. 5, 2022

(54) FABRICATION OF IRIDIUM OXIDE PH SENSORS AND SENSORY ARRAYS

(71) Applicants: Board of Regents, The University of Texas System, Austin, TX (US); Jung-Chih Chiao, Grand Prairie, TX (US); Cuong M. Nguyen, Arlington, TX (US); Smitha M N Rao, Euless, TX (US)

(72) Inventors: Jung-Chih Chiao, Grand Prairie, TX (US); Cuong M. Nguyen, Arlington, TX (US); Smitha M N Rao, Euless, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 371 days.

(21) Appl. No.: 15/023,627

(22) PCT Filed: Sep. 22, 2014

(86) PCT No.: PCT/US2014/056816
§ 371 (c)(1),
(2) Date: Mar. 21, 2016

(87) PCT Pub. No.: WO2015/042539
PCT Pub. Date: Mar. 26, 2015

(65) Prior Publication Data
US 2016/0209348 A1 Jul. 21, 2016

Related U.S. Application Data

(60) Provisional application No. 61/880,623, filed on Sep. 20, 2013.

(51) Int. Cl.
*G01N 27/30* (2006.01)
*G01N 27/416* (2006.01)
(Continued)

(52) U.S. Cl.
CPC ............ *G01N 27/302* (2013.01); *C23F 1/00* (2013.01); *G01N 27/27* (2013.01); *G01N 27/4167* (2013.01)

(58) Field of Classification Search
CPC .. G01N 27/302; G01N 27/27; G01N 27/4167; C23F 1/00
See application file for complete search history.

(56) References Cited

U.S. PATENT DOCUMENTS 5,213,675 A * 5/1993 Yamaguchi .......... G01N 27/414
204/416
2002/0190415 A1* 12/2002 Yang ..................... B82Y 30/00
264/42

(Continued)

FOREIGN PATENT DOCUMENTS

WO 2010118235 10/2010
WO 2011105665 9/2011

OTHER PUBLICATIONS

Xia et al. (Y Xia, GM Whitesides, Soft Lithography, Angew. Chem. Int. Ed. 37 (1998) 550-575). (Year: 1998).*

(Continued)

*Primary Examiner* — Joshua L Allen
(74) *Attorney, Agent, or Firm* — Winstead PC

(57) ABSTRACT

A method of fabricating amorphous iridium oxide film pH sensors and microfluidic devices incorporating the pH sensors. The present invention provides a fabrication method for sol-gel based iridium oxide (IrOx) thin film pH sensors and microelectrodes. The invention further provides microelectrode arrays produced by the fabrication methods and microfluidic devices including the microelectrodes and microelectrode arrays. In one aspect, the invention is a method for fabricating a microelectrode pH sensor.

17 Claims, 6 Drawing Sheets

(51) Int. Cl.
*G01N 27/27* (2006.01)
*C23F 1/00* (2006.01)

(56) References Cited

U.S. PATENT DOCUMENTS

| | | | | |
|---|---|---|---|---|
| 2005/0230767 A1* | 10/2005 | Park | ............... | B01L 3/502707 257/414 |
| 2007/0039822 A1* | 2/2007 | Henry | ............... | G01N 27/4473 204/451 |
| 2011/0140703 A1* | 6/2011 | Chiao | ............... | G01N 27/403 324/438 |
| 2015/0114836 A1* | 4/2015 | Clark | ............... | A61B 5/1473 204/403.02 |
| 2016/0187281 A1* | 6/2016 | Park | ............... | G01N 27/302 204/433 |

OTHER PUBLICATIONS

Huang 1 (WD. Huang, J Wang, T Ativanichayaphong, M Chiao, JC Chiao, Development of an IrOx micro pH sensor array on flexible polymer substrate, Proc. SPIE 6931, Nanosensors and Microsensors for Bio-Systems 2008, 693104 (Mar. 26, 2008)) (Year: 2008).*

Huang 2 (W-D Huang, L-C Hsu, J Wang, T Ativanichayaphong, S Deb, M Chiao, JC Chiao, Investigation of repeatability of sol-gel iridium oxide pH sensor on flexible substrate, Proc. SPIE 7269, Micro- and Nanotechnology: Materials, Processes, Packaging, and Systems IV, 726916 (Dec. 30, 2008)) (Year: 2008).*

Nishio 1 (K Nishio, T Tsuchiya, Electrochromic thin films prepared by sol-gel process, Solar Energy Materials & Solar Cells 68 (2001) 279-293) (Year: 2001).*

Nishio 2 (K Nishio, Y Watanabe T Tsuchiya, Preparation and properties of electrochromic iridium oxide thin film by sol-gel process, Thin Solid Films 350 (1999) 96-100) (Year: 1999).*

Wen-Ding Huanga, Hung Caoa, Sanchali Deba, Mu Chiaob, J.C. Chiao, A flexible pH sensor based on the iridium oxide sensing film, Sensors and Actuators A: Physical.

International Search Report in related application No. PCT/2014/056816, dated Dec. 30, 2014.

* cited by examiner

FABRICATION OF IRIDIUM OXIDE PH SENSORS AND SENSORY ARRAYS

FIELD OF THE INVENTION

The present invention relates in general to the field of sensors, and more particularly to the fabrication of amorphous iridium oxide film pH sensors.

BACKGROUND pH sensors are used in clinics, laboratories and industrial factories since many biological and chemical reaction mechanisms are pH dependent. Conventional glass-type electrodes have been widely used; however, they have certain disadvantages in specific applications. The glass rod sensor configuration is difficult to use for in vivo biomedical, clinical, or food monitoring applications due to the brittleness of glass, size limitations, and the lack of deformability. To achieve small sizes and robust design, ion-sensitive field-effect transistor (iSFET) pH sensors [1-5], optical fiber pH sensors [1, 6-11], hydrogel film pH sensors [12-14], and solid state pH sensors [1, 15-18] have been proposed. iSFET sensors have power consumption concerns due to the field-effect transistor (FET) operational requirements [19]. Hydrogel film pH sensors utilize the physical properties of the pH-responsive swelling and shrinking polymer to measure resistance changes [12]. The sensor structure design and polymer layer fabrication process can be complicated and expensive [13]. Optical pH sensors also have power consumption issues due to the use of light sources. A system including optical devices could be expensive and unsuitable for implantation [1, 7-8, 10-11].

Various solid-state metal oxides have been investigated for pH sensing electrodes [1, 15] including $PtO_2$, IrOx, $RuO_2$, $OsO_2$, $Ta_2O_5$, $RhO_2$, $TiO_2$, and $SnO_2$ as the pH sensing films. The pH sensitivity, selectivity, working range, and hysteresis determine sensing performance. IrOx, $RuO_2$, and $SnO_2$ have demonstrated more advantages in sensor performance for various applications [22]. $RuO_2$ [18, 20] and $SnO_2$ [21] show near Nernstian responses in wide pH ranges. However, $SnO_2$ and $RuO_2$ present hysteresis and drift problems leading to potential calibration issues and unstable responses [20, 21]. Iridium oxide film (IROF) has exhibited outstanding stability over wide pH ranges, rapid response, less hysteresis, and high durability; these characteristics have been demonstrated at high temperature up to 250° C. [23].

There are different fabrication methods for iridium oxide films including sputtering deposition [23, 24], electrochemical deposition [25-29], thermal oxidation [23], and sol-gel [30-32] processes. The sputtering iridium oxide film (SIROF) deposition process is costly due to the target cost. The oxygen and argon pressure ratios, position of the target, deposition rate, and RF powers during the fabrication processes all affect the pH sensing parameters such as potential drifts and redox interference [22]. Anodic electrochemical deposition presents an economical way for iridium oxide thin film fabrication. The anodic iridium oxide thin film (AIROF) process is based on electrolysis of a solution containing iridium complexes. The iridium tetrachloride compound has been widely used as a deposition agent [26-29] such as the commonly used Yamanaka solution [26]. The pH value of the deposition solution, solution temperature and current density control affect the deposition efficiency [26-29]. A precise power supply system as potentiostate is required in the electro-deposition process for thickness and film quality control. Thermal oxidation processes require a high temperature ranging from 500 to 800° C. [17, 22]. The film made by thermal oxidation can be thicker than the AIROF with more stable potentials [22, 23]. However, the film surface has a tendency to crack after the high temperature treatment. The adhesion property of the cracked film then becomes an issue. The high temperature treatment also becomes a limitation during sensor fabrication, especially for the use of polymer and photoresist, which often can not survive at a temperature above 200° C. The sol-gel IROF deposition process has been demonstrated [32] with dip coating [32, 33] and heat treatment [31, 32] procedures. Sol-gel deposition provides a simpler and economical fabrication approach.

Integrating pH sensors in microfluidic systems can provide in-situ measurement functionality for micro-scale fluidic processing and analyzing applications, especially for medicine synthesis, bioanalysis of drugs and environmental specimens, and biological studies of cells. Conventional methods to monitor pH levels inside microfluidic channels using pH responsive dyes or tag-based indicators possess several disadvantages, including potential contamination, photo-bleaching of the indicators, and narrow dynamic responses. Thus miniaturized electrochemical pH sensors for microfluidic systems have been proposed to overcome these issues while providing real-time and time-lapsed measurement results.

There is a need for miniaturized microelectrode pH sensors for microfluidic systems and for a reproducible method to mass produce micro-scale pH sensors to be used in microfluidic systems.

SUMMARY OF THE INVENTION

The present invention provides a fabrication method for sol-gel based iridium oxide (IrOx) thin film pH sensors and microelectrodes. The invention further provides microelectrode arrays produced by the fabrication methods and microfluidic devices including the microelectrodes and microelectrode arrays.

In one aspect, the invention is a method for fabricating a microelectrode pH sensor. As an initial step at least one metal layer is deposited on a substrate. Desirably, a first layer and a second layer are deposited on a substrate. Desirably the first layer is chromium and the second layer is gold. The chromium and gold layers are coated with a photoresist layer and an electrode is defined photolithographically. The gold and chromium layers are etched to define the electrode.

A microfluidic mold is supplied which includes a reservoir region and a channel. In one embodiment the microfluidic mold is made by pouring and curing polydimethylsiloxane (PDMS) on a silicon wafer comprising a patterned SU-8 mold. The PDMS layer is peeled off of the silicon wafer to form the microfluidic mold. The mold is made to correspond to the configuration of the electrode, as explained below.

The microfluidic mold is aligned onto the electrode-substrate assembly created as above so that a pathway is defined from the reservoir region through the channel to the electrode. Next, an iridium oxide sol-gel solution is poured into the reservoir so that it flows through the channel and coats the electrode sensor.

To finish the pH sensor, the microfluidic mold is detached from the glass substrate, the pH sensor is cured and coated with a photoresist, and the sensing sites are opened.

As an additional step, one or more metal layers are deposited on the substrate by forming a pattern on the encapsulation layer, depositing at least one metal layer on the pH sensing array, and then opening the sensing electrode sites.

In another aspect, the invention is a method for fabricating a microelectrode sensor array following a similar method as above for the electrode sensor. At least one metal layer is deposited on a substrate. Desirably, first and second layers are deposited on a substrate. Desirably the first layer is chromium and the second layer is gold. The chromium and gold layers are coated with a photoresist layer and pattern of microelectrodes is defined photolithographically. The gold and chromium layers are etched to define the pattern of microelectrode array.

A microfluidic mold is supplied which includes one or more reservoir regions and an array of channels leading from the reservoir region(s). In one embodiment the microfluidic mold is made by pouring and curing polydimethylsiloxane (PDMS) on a silicon wafer comprising a patterned SU-8 mold. The PDMS layer is peeled off of the silicon wafer to form the microfluidic mold. The mold is made to correspond to the configuration of the electrode sensor array, as explained below.

The microfluidic mold is aligned onto the electrode array-substrate assembly created as above so that a pathway is defined from the reservoir region(s) through the channels to the electrodes. Next, an iridium oxide sol-gel solution is poured into the reservoir(s) so that it flows through the channels and coats the electrode sensors.

To finish the pH sensor array, the PDMS layer is detached from the glass substrate, the pH sensor array is cured and coated with a photoresist and the sensing sites are opened.

As an additional step, one or more metal layers are deposited on the substrate by forming a pattern on the encapsulation layer, depositing at least one metal layer on the pH sensing array, and then opening the sensing electrode sites.

Desirably the substrate is a glass substrate. The chromium and gold may be deposited onto the glass substrate by any known method. Preferably, the chromium and gold layers are deposited onto the glass substrate via e-beam evaporation. The photoresist may comprise any known photoresist composition and is preferably SU-8. In certain aspects, the coating steps are accomplished via a spin-coating process. Typically, after the sol-gel solution is dispensed onto the array, excess sol-gel solution is retreated from the reservoir and the device is dried. After the PDMS is detached from the glass substrate, the sensor array is thermally treated.

The invention further provides an apparatus comprising the microelectrode array produced according to the fabrication method described above integrated onto a microfluidic device.

The advantages of the fabrication methods include that a small amount of sol-gel material can be deposited onto the metal electrode site. In addition, multiple sensors can be made by one deposition step of injecting the solution into the reservoir and the sensor electrodes performance will be uniform since the fabrication micro environment is identical for all sensors.

BRIEF DESCRIPTION OF THE DRAWINGS

Further benefits and advantages of the present invention will become more apparent from the following description of various embodiments that are given by way of example with reference to the accompanying drawings.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
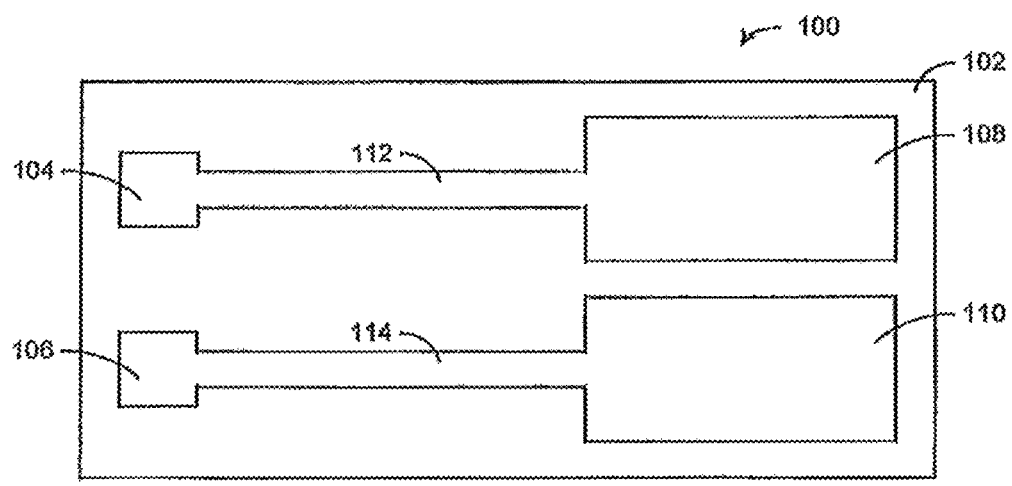
FIG. 1 illustrates a pH sensor in accordance with one embodiment of the present invention.
Figure 2:
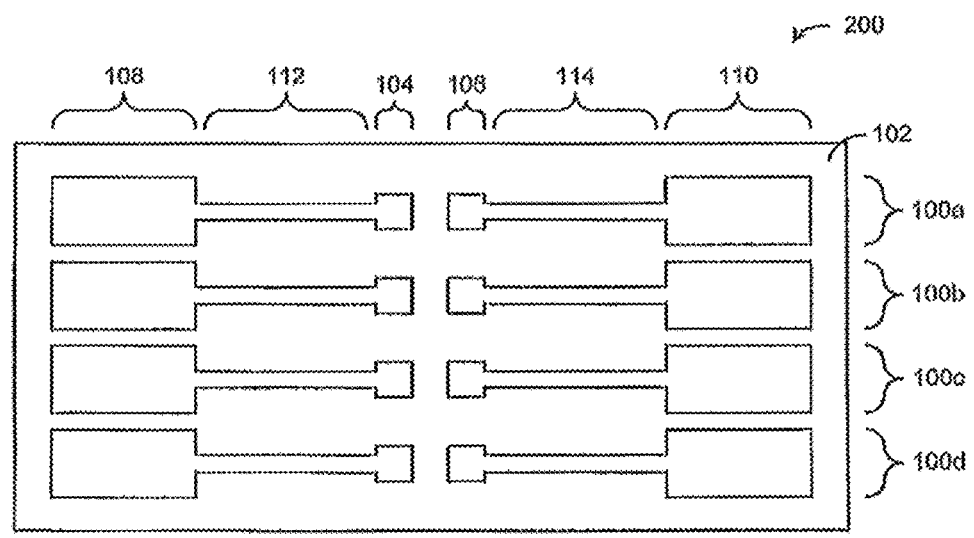
FIG. 2 illustrates an array of pH sensors in accordance with another embodiment of the present invention.

Examples of configurations of pH sensors for use in the present invention are provided in FIG. 1 and FIG. 2. Now referring to FIG. 1, a pH sensor 100 in accordance with one embodiment of the present invention is shown. The pH sensor 100 includes a substrate 102, an amorphous iridium oxide film sensor electrode 104 disposed on the substrate 102 and a reference electrode 106 disposed on the substrate 102 in close proximity to the amorphous iridium oxide film sensor electrode 104. In addition, a first electrical contact pad 108 is disposed on the substrate 102 and is electrically connected to the amorphous iridium oxide sensor 104 via a conductive trace, connector, or pathway 112. Similarly, a second electrical contact pad 110 is disposed on the substrate 102 and electrically connected to the reference electrode via a conductive trace, connector, or pathway 114. As will be described in more detail below, the amorphous iridium oxide film sensor electrode 104 provides a potential in reference to the reference electrode 106 that varies according to a pH of a substance contacting the amorphous iridium oxide film sensor electrode 104 and the reference electrode 106. Note that the present invention is not limited to the specific orientation shown in FIG. 1. Moreover, FIG. 1 is not to scale. As a result, any suitable orientation of the components can be used, and the components can be of any suitable geometric shape. One example of a process for fabricating the pH sensor 100 will be described in more detail below.

Referring now to FIG. 2, an array 200 of pH sensors in accordance with another embodiment of the present invention is shown. As shown, the pH sensor array 200 includes four iridium oxide film pH sensors 100a, 100b, 100c and 100d disposed on a substrate 102. The array can contain any number of pH sensors 100. A reference electrode 106 is disposed on the substrate 102 in close proximity to each corresponding amorphous iridium oxide film sensor electrode 104. A first electrical contact pad 108 corresponding to each amorphous iridium oxide film sensor electrode 104 is disposed on the substrate 102 and electrically connected to the corresponding amorphous iridium oxide sensor 104 via a conductive trace, connector, or pathway 112. A second electrical contact pad 110 corresponding to each reference electrode 106 is disposed on the substrate 102 and electrically connected to the corresponding reference electrode 106 via a conductive trace, connector, or pathway 114. The amorphous iridium oxide film sensor electrodes 104 provide a potential in reference to the reference electrodes 106 that varies according to a pH of a substance contacting the amorphous iridium oxide film sensor electrodes 104 and the reference electrodes 106. Note that the present invention is not limited to the specific orientation shown in FIG. 2. Moreover, FIG. 2 is not to scale. As a result, any suitable orientation of the components can be used, and the components can be of any suitable geometric shape.

Figures 3A, 3B, 3C, 3D, 3E, 3F, 3G, 3H:
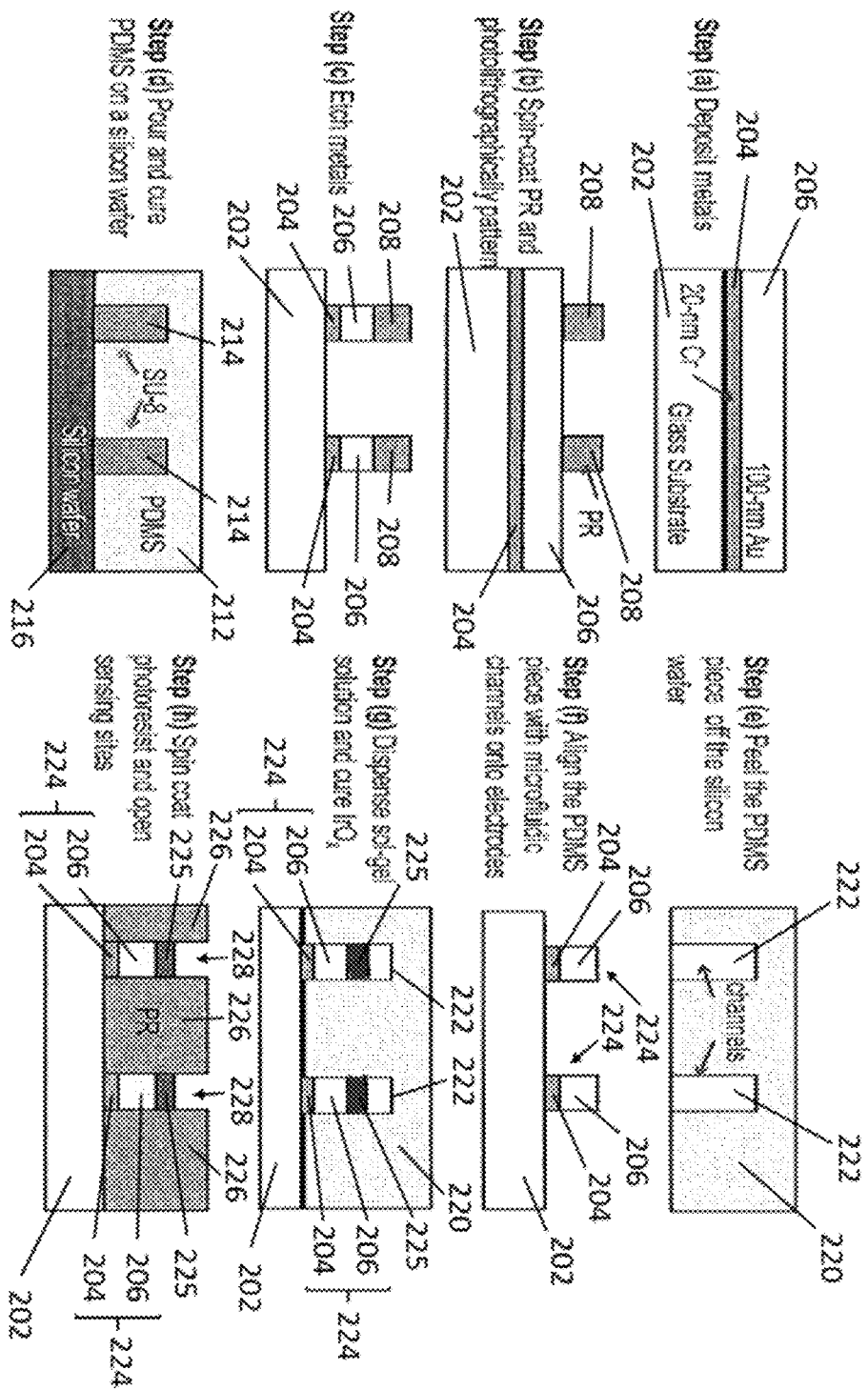
FIGS. 3A-3H illustrate a method for fabricating a pH sensor in accordance with the methods of the present invention. Gold and Chromium are deposited on a glass slide (FIG. 3A); a NR-0 photoresist layer and pattern microelectrodes are spin-coated (FIG. 3B); the Au and Cr layers are etched (FIG. 3C); PDMS is poured on a silicon wafer with patterned SU-8 mold (FIG. 3D); the PDMS layer is peeled off the silicon wafer (FIG. 3E); the PDMS piece is aligned onto the microelectrodes (FIG. 3F); an IrOx sol-gel solution is dispensed and the IrOx cured (FIG. 3G); photoresist is spin-coated and pattern sensing sites for the micro pH sensors are opened (FIG. 3H).

The fabrication processes are depicted in FIGS. 3A-3H and FIG. 7. As an initial step, at least one metal layer, here shown as layers of chromium 204 and gold 206 are deposited on a substrate 202, preferably by e-beam evaporation (FIG. 3A). Desirably, for some applications, the substrate 202 is glass and optically transparent providing a compatible means for studies of cells. However, the substrate can be any appropriate material, such as a flexible polymer. In preferred aspects, the thickness of the chromium layer 204 is between 15 nm and 40 nm, preferably about 20 nm, and the thickness of the gold layer 206 is between 80 nm and 150 nm, preferably about 100 nm.

Photolithography and etching processes are carried out to define the array configuration. As shown in FIG. 3B a photoresist layer 208 and pattern microelectrodes are spin-coated onto the Cr/Au layers 204/206. The Au and Cr layers 204/206 are then etched as illustrated in FIG. 3C and the photoresist layer 208 is removed as shown in FIG. 3F.

The microfluidic mold 220 with micro-dispensing channels 222 was fabricated as shown in FIG. 3D and FIG. 3E. PDMS was poured onto a SU-8 mold 214 patterned with the micro-dispensing Channels 222 on a silicon wafer 216. After curing, a reservoir 223 (FIG. 4A) was created by punching out a hole of 3-mm diameter and then the PDMS layer 212 is peeled off the silicon wafer 216 (FIG. 3E) to form the PDMS device 220.

The microfluidic device 220 can be made out of a variety of materials, the important aspects are that it defines one or more reservoir regions 223 and one or more fluidic channels 222 appropriately arranged for the sensor 100 or sensor array 200.

Figure 4A:
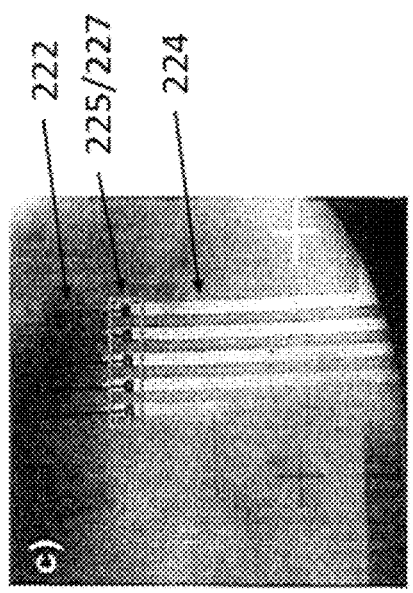
FIGS. 4A-4D illustrate a PDMS reservoir placed on top of a microelectrode array (FIG. 4A); a model of micro-channels to dispense sol-gel solution on the microelectrodes (FIG. 4B); a microscope image of IrOx on an electrode after coating (FIG. 4C); and an SEM photo of the surface of the IrOx microelectrode.

The PDMS device 220 was aligned on top of the glass substrate 202 with each micro-dispensing channel 222 in contact with each metal electrode 224, as shown in FIG. 3F and FIG. 4A.

Figure 4B:
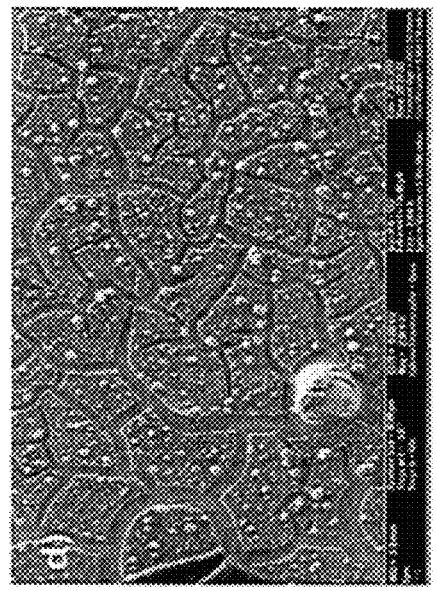

The IrOx sol-gel solution was prepared generally according to the method published in [1]. One gram of anhydrous iridium chloride (IrCl4) was dissolved in 42 ml of ethanol. 10 ml of acetic acid was added in the solution. The coating solution was stirred by a magnetic rod for one hour. A small volume of this sol-gel solution 225 was dispensed into the PDMS reservoir 223 and allowed to automatically dispense across the coating sites 227 of each of the microelectrodes 224 as depicted in FIG. 3G. The set-up is illustrated in FIG. 4B.

Figure 4C:
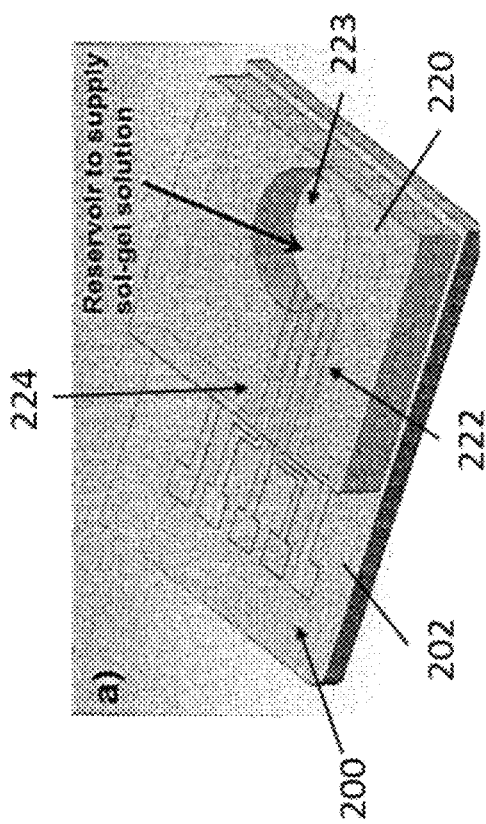
Figure 4D:
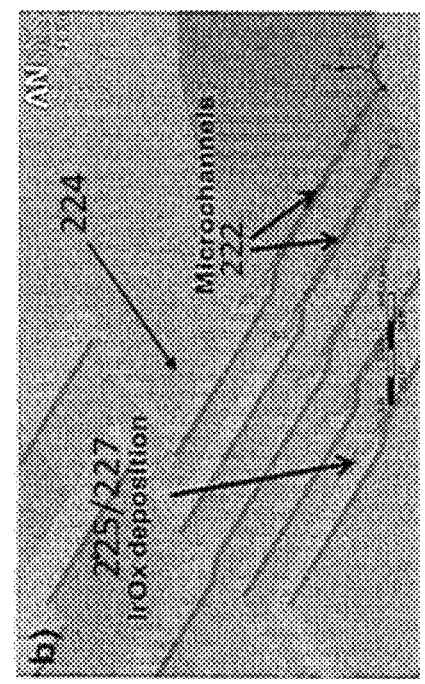

When the sol-gel solution with high concentration of ethanol was dripped into the reservoir 223, it quickly flowed through the channels 222 toward the patterned electrodes 224. Excessive sol-gel solution was removed from the reservoir 223 and the device was dried at 50° C. for 10 minutes. The PDMS device 220 was then detached from the glass substrate 202 before the sensor array 200 was thermally treated at 300° C. for 5 hours to form the anhydrous IrOx thin-film 225. FIG. 4C shows iridium oxide film covered electrodes 224 after electrodeposition. EDAX analysis and SEM pictures, shown in FIG. 4D, confirmed the elements present on the electrode surface. Finally, a layer of SU-8 photoresist 226 was spin-coated and patterned to open only the sensing sites 228 as shown in FIG. 3H.

Figure 7:
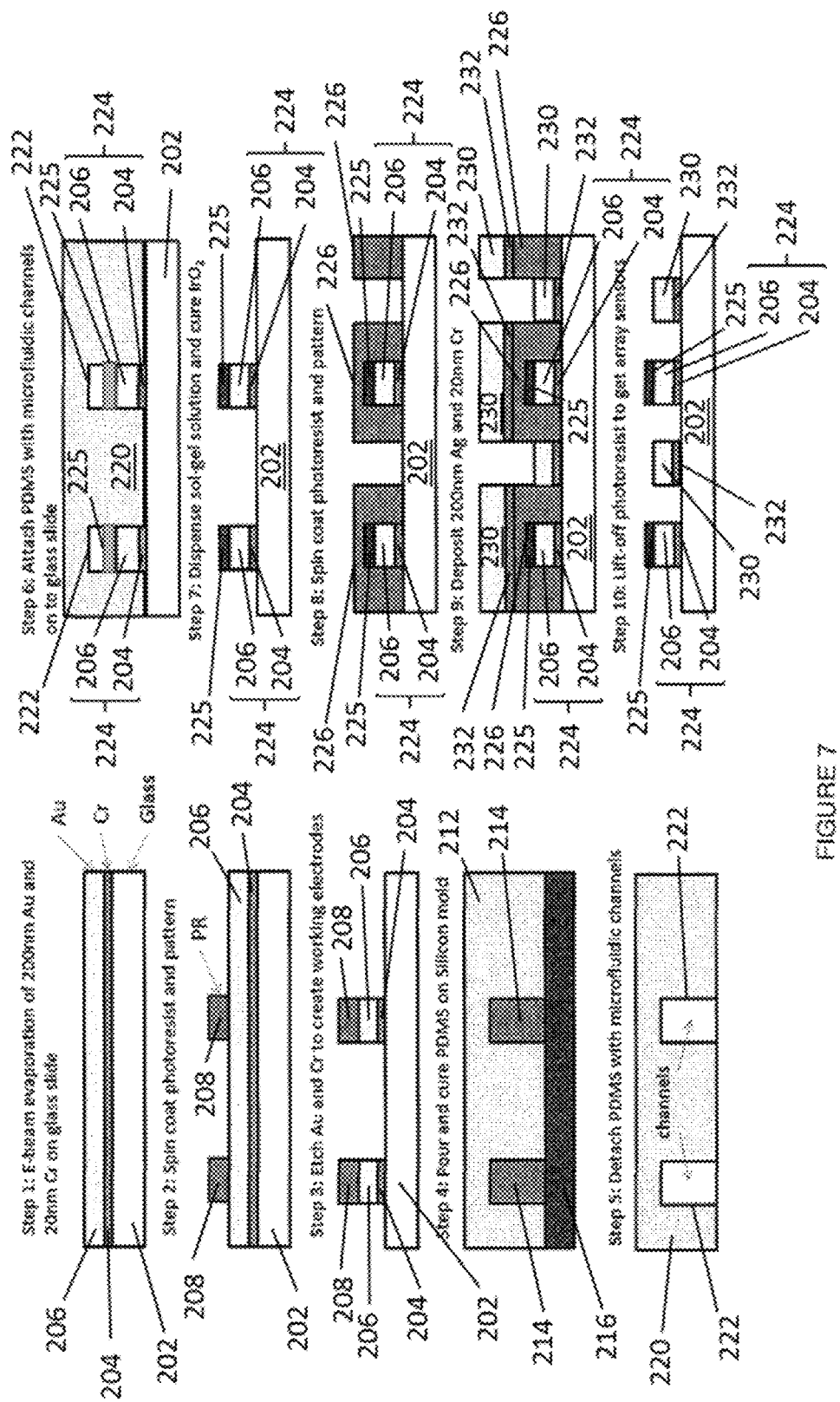
FIG. 7 illustrates the method of fabrication including additional steps 9 and 10 of depositing additional silver and chromium layers onto the glass substrate.

Optional additional steps are illustrated in FIG. 7. After step 7, dispensing and curing the IrOx 225; and removal of the microfluidic mold (step not shown), a coating of photoresist 226 is applied and then etched to form the desired pattern on the substrate 202. One or more additional metal layers 230, 232 are deposited to the device, to the substrate 202, and then the photoresist layer 226 is removed.

Microfluidic structures designed for specific studies were placed onto the glass substrate to incorporate the pH sensor array.

The thickness of the IrOx layer deposited onto the electrodes was measured by a profilometer. A layer of IrOx at least 0.7 μm thick was deposited on the gold electrodes. The thickness can be controlled with the viscosity of solution and microfluidic channel designs.

Three possible mechanisms have been proposed for pH dependent redox equilibrium between two oxidation states of the iridium oxide [46] as

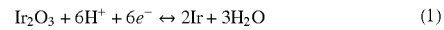  (1)

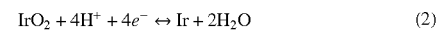  (2)

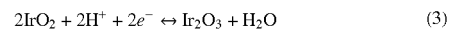  (3)

$$E = E^0 - 2.303 \frac{RT}{F} \text{pH} = E^o - 59.16 \text{ pH} \quad (4)$$

where: $E^o$ is the standard electrode potential with a value of 926 mV;

F is the Faraday's constant with a value of 96,487 coul/equiv; and

R is the gas constant with a value of 8.314 joules/deg. RT/F is equal to 25.688 at 25° C. The pH potential sensitivity is 59 mV/pH if space charges are formed [22, 46]

which is called the Nernstian response. The pH sensitivity of our sensor is based on the super-Nernstian potential response [44] as the sensitivity will be higher than 59 mV/pH.

The sensitivity of the IrOx pH sensor was validated by pH titration tests at room temperature. DI water, HCl, and KOH were used during the titrations. Three sensor electrodes in an array were used to demonstrate the linear super-Nernstian response. The results showed sensitivity ranging from −71.5 mV/pH to −81.7 mV/pH. Potential responses with seven different pH levels from 11.8 to 1.92 resulted in sensitivity between −69.6 mV/pH and −71.8 mV/pH as HCl was dripped in diluted KOH solution for titration. The different sensitivities may be caused by the state of oxide [49]. The sensitivity of IrOx increases when the oxidation state reduces. A higher potential coincided with a high valence oxide and vice versa [49]. During the tests, our pH electrode array on flexible substrate showed higher sensitivity, compared to the electrode formed by other methods which typically have sensitivities in the range of 55-70 mV/pH [22, 47-48].

The response time of the pH sensor was measured in three different tests. The first test was from the acid to alkaline condition by quickly dripping 0.1M KOH into an acidic solution contacting the sensor. The second test was from alkaline to acid by quickly dripping 0.1M HCl into an alkaline solution contacting the sensor. The third test involved dripping diluted HCl droplets directly on the dry sensing electrode surface of the sensor. The response time of pH electrodes is defined as the time needed for the potential change to reach 90% within the equilibrium value of potential [22].

A response time of 0.9 second with a measured potential step change from pH 4 to 11 was obtained. From pH 12 to 3.5, the response time was about 2 seconds. With the dry electrode, adding pH 4 solution induced a potential step change with a response time of 0.8 s. The response times did vary due to the solution mixture, thus repeated experiments were conducted. Generally speaking the pH sensor responds to added solution within a time period of 2 s.

Compared with the response times of 5-15 seconds reported in literatures [57-58], this response time of about 2 seconds for our IrOx flexible pH sensor was shorter and consistent with different pH level changes. This may be due to the better quality of the IrOx film with appropriate coating and annealing processes in our sol-gel fabrication. The bulk pH solution needs to equilibrate the liquid in the pores of iridium oxide film in which the process increases the response time. Thus, although our sol-gel IrOx film has lower porosity, which provides less sensitivity than porous AIROF and SIROF, the sensor responds more quickly.

Responses of the IrOx electrodes in a series of different pH levels were tested. The diluted KOH solution was titrated by 1M of HCl dripping from pH 12.1 to 1.5. The pH values were recorded by the Hanna pH sensor. During the test, the IrOx pH sensor potentials followed the pH values coordinately and kept stable in each pH step. Three tests showed the electrode behaved similarly with little difference, having a linear response from pH 12.1 to 1.5.

Figures 5A, 5B, 5C:
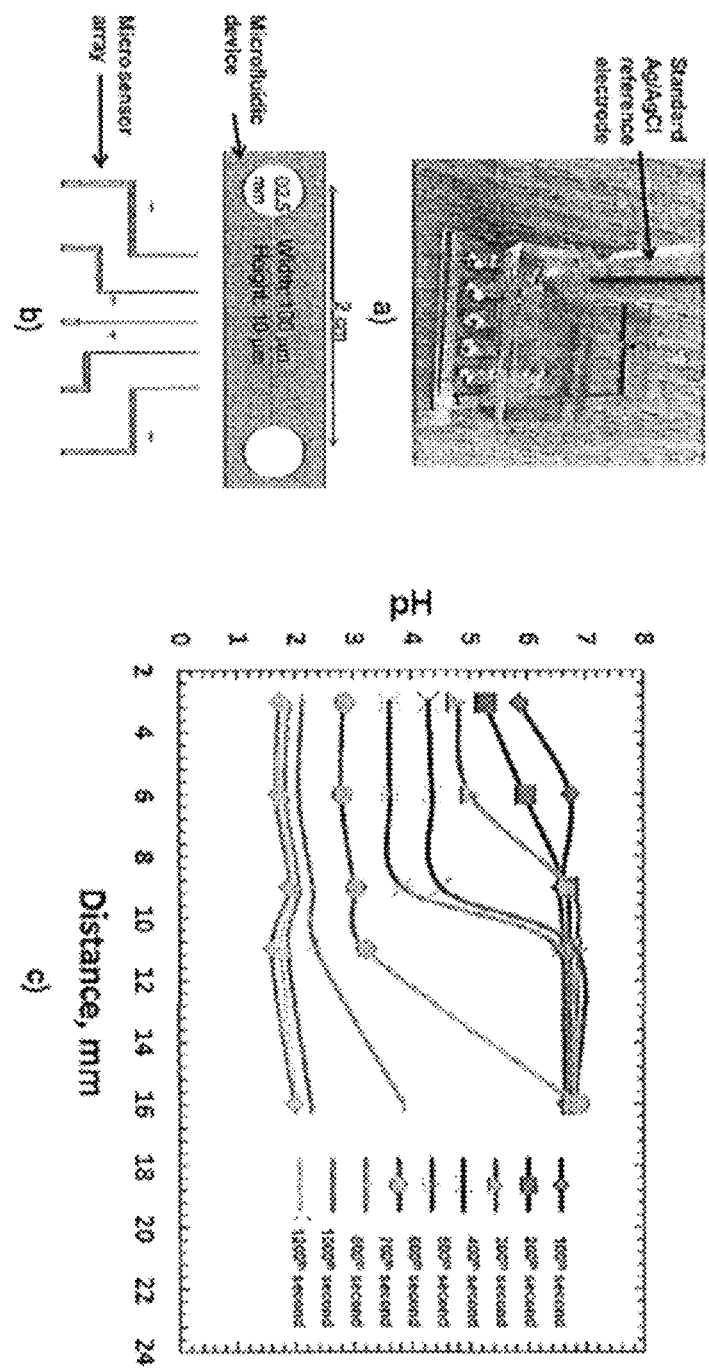
FIGS. 5A-5C illustrate an experimental setup of a microfluidic device using a micro pH sensor array (FIG. 5A); the design of the microfluidic device (FIG. 5B); and pH spatial and temporal responses of the sensor array after adding 0.1M HCl solution to the reservoir.

The micro pH sensor array was integrated with a PDMS microfluidic device. FIG. 5A shows the experiment setup while FIG. 5B displays the dimension of the microfluidic device that had two reservoirs connected through a microfluidic flow tunnel with a height of 10 µm and a width of 100 µm. All five pH sensors shared the same standard Ag/AgCl reference as shown in FIG. 5A. The two reservoirs and the microfluidic flow tunnel were filled with phosphate buffered saline solution (pH 7.0). A chemical mixing incident was created by adding 0.1M HCl solution into the right reservoir. The micro pH sensors placed along the microfluidic flow tunnel monitored the change in pH of the solution corresponding to the diffusion of $H^+$ ions. FIG. 5C displays the pH values indicated by different pH sensors located at different distances from the reservoir containing HCl. The pH values of the sensors decreased with time. After 1200 seconds, all sensors indicated pH values of around 1.5, which means the concentration of $H^+$ ions inside the microfluidic flow tunnel became homogeneous due to diffusion. The experiment thus demonstrated the use of the microelectrodes to spatially and temporally monitor pH change in microfluidic devices.

The fabrication process described herein produces sol-gel-based micro pH sensors with a wide sensing range, robustness, and high durability for long-term experiments. Sol-gel coating solution was automatically distributed through micro-dispensing channels made of PDMS to the sensors with sensing sizes of 100×100 µm². The fabrication approach described herein effectively enhances the reproducibility and mass production ability of the micro-scale pH sensors. The sensitivities of the sol-gel-based pH sensors produced using the methods of the present invention remained in the range of 51.0-56.1 mV/pH after three days of fabrication. The micro-electrode array was integrated to a microfluidic device to spatially and temporally monitor pH changes in a chemical mixing process.

Figure 6:
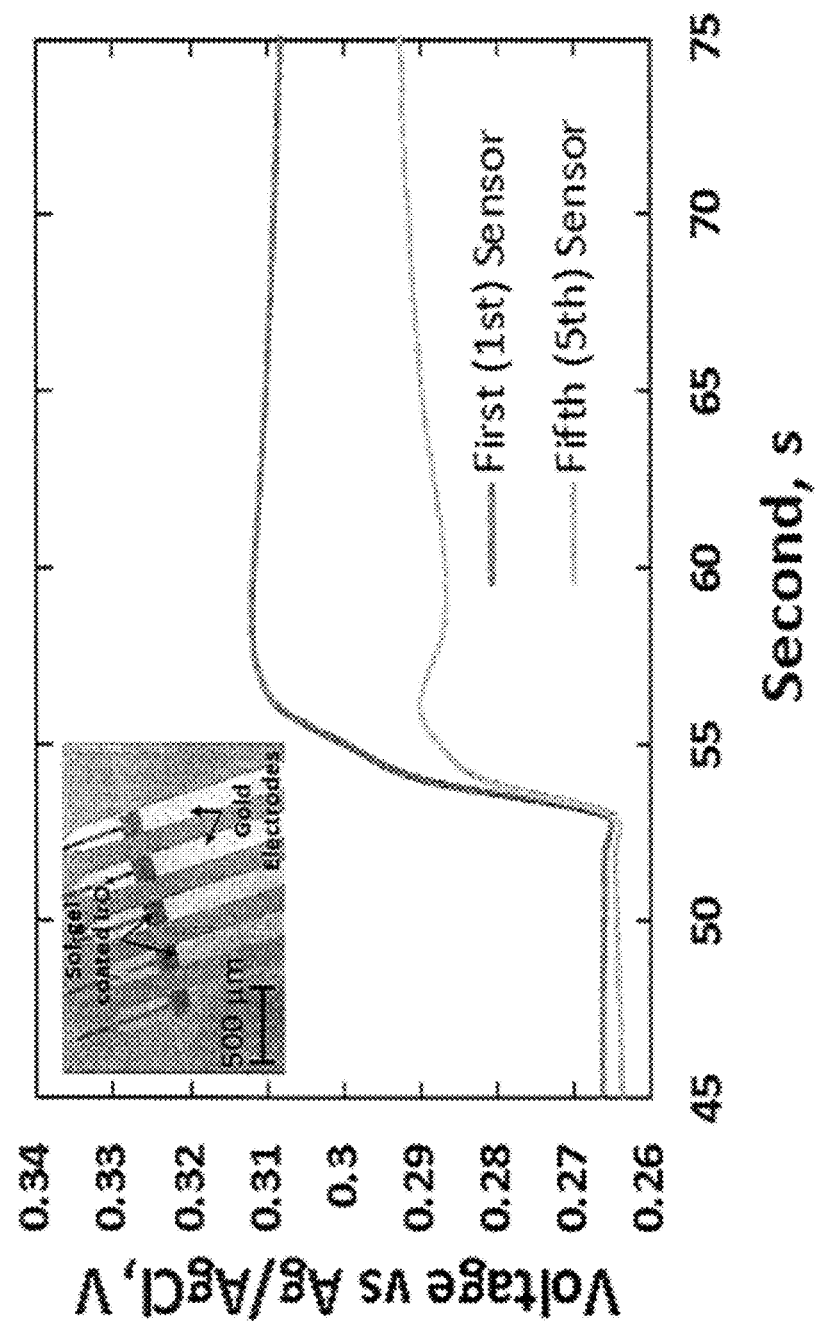
FIG. 6 shows a micrograph of the electrode array and illustrates the voltage response of two pH electrodes vs. an Ag/AgCl reference electrode.

FIG. 6 shows a micrograph of a pH electrode array inside the transparent PDMS microfluidic structure. IrOx was coated on each electrode within an area of 100×100 µm². The temporal response of the sensor array in a microfluidic flow tunnel with a 100-µm width connecting two chambers was tested. The chambers and tunnel were initially filled with DI water. Voltage responses of the 1st and the 5th electrodes were recorded versus a standard Ag/AgCl reference electrode when a droplet of buffer solution with pH 4 was added into one chamber which was closer to the 1st sensor. The buffer solution diffused through the microfluidic tunnel toward the other chamber. The 1st sensor reached a higher potential indicating a lower pH level than that of the 5th sensor due to the effect of dilution. The 1st sensor also responded more quickly than the 5th sensor indicating that the sensor detected the pH change first as the pH 4 buffer diffused through the tunnel. The sensitivities of sensors were tested within the range of 51.0-56.1 mV/pH.

The present invention can be used to provide in-situ measurement functionality for micro-scale fluidic processing and analyzing applications, especially for medicine synthesis, bioanalysis of drugs and environmental specimens and biological studies of cells.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

REFERENCES

[1] John G. Webster, "The measurement, instrumentation and sensors handbook," *CRC Press and IEEE Press*, pp. 71, Florida, 1999.

[2] Young-Jin Kim, Young-Chul Lee, Byung-Ki sohn, Jung-Hee Lee, and Chang-Soo Kim, "A novel pH microsensor with a built-in reference electrode", *Journal of the Korean Physical Society*, Vol. 43, pp. 769-772, 2003.

[3] Yi Liu, Tianhoung Cui, "Ion-sensitive field-effect transistor based pH sensors using nano self-assembled polyelectrolyte/nanoparticle multilayer films," *Sensors and Actuators B*, Vol. 123, pp. 148-152, August, 2006.

[4] Jinghong Han, Dafu Cui, Yating Li, Hong Zhang, Yuzi Huang, Zipan Zheng, Yarning Zhu and Xiangming Li, "A gastroesophageal tract pH sensor based on the H-ISFET and the monitoring system for 24 h," *Sensors and Actuators B*, Vol. 66, pp. 203-204, July, 2000.

[5] Kalman Pasztor, A. Sekiguchi, N. Shimo, N. Kitamura and H. Masuhara, "Iridium oxide-based microelectrochemical transistors for pH sensing," *Sensors and Actuators B*, Vol. 12, pp. 225-230, 1993.

[6] Otto S. Wolfbeis, "Fiber-optic chemical sensors and biosensors," *Anal. Chem.*, Vol. 76, pp. 3269-3284, 2004.

[7] Sheila A. Grant, Robert S. Glass, "A sol-gel based fiber optic sensor for local blood pH measurements," *Sensors and Actuators B*, Vol. 45, pp. 35-42, 1997.

[8] Saying Dong, Ming Luo, Gangding Peng, and Wenhua Cheng, "Broad range pH sensor based on sol-gel entrapped indicators on fiber optic," *Sensor and Actuators B: Chem.* Vol. 129, pp. 94-98, January, 2008.

[9] Zhe Jin, Yongxuan Su, and Yixiang Duan, "An improved optical pH sensor based on polyaniline," *Sensors and Actuators B*, Vol. 71, pp. 118-122, November, 2000.

[10] Afsaneh Safavi, Mozhgan, "Novel optical pH sensor for high and low pH values," *Sensors and Actuators B*, Vol. 90, pp. 143-150, April, 2003.

[11] E. Alvarado-Mendez, R. Rojas-Laguna, J. A. Andrade-Lucio, D. Hernandez-Cruz, R. A. Lessard, and J. G. Avina-Cervantes, "Design and characterization of pH sensor based on sol-gel silica layer on plastic optical fiber," *Sensors and Actuators B*, Vol. 106, pp. 518-522, May, 2005.

[12] Norman F. Sheppard, Jr., Matthew J. Lesho, Philip McNally, and A. Shaun Francomacaro, "Microfabricated conductimetric pH sensor," *Sensors and Actuators B*, Vol. 28, pp. 95-102, August, 1995.

[13] Gerald Gerlach, Margarita Guenther, Joerg Sorber, Gunnar Suchaneck, Karl-Friedrich Arndt, and Andreas Richter, "Chemical and pH sensors based on the swelling behavior of hydrogels," *Sensors and Actuators B*, Vol. 111-112, pp. 555-561, November, 2005.

[14] R. Bashir, J. Z. Hilt, O. Elibol, A. Gupta and N. A. Peppas, "Micromechanical cantilever as an ultrasensitive pH microsensor," *Applied Physics Letters*, Vol. 81, pp. 3091-3093, 2002.

[15] Agner Fog, Richard P. Buck, "Electronic semiconducting oxides as pH sensors," *Sensors and Actuators*, Vol. 6, pp. 137-146, 1984.

[16] T. Mikolajick, R. Kuhnhold, and H. Ryssel, "The pH-sensing properties of tantalum pentoxide films fabricated by metal organic low pressure chemical vapor deposition," *Sensors and Actuators B*, Vol. 44, pp. 262-267, 1997.

[17] Patrick J Kinlen, John E. Heider, and David E. Hubbard, "A solid-state pH sensor based on a Nafion-coated iridium oxide indicator electrode and a polymer-based silver chloride reference electrode," *Sensors and Actuators B*, Vol. 22, pp. 13-25, October, 1994.

[18] H. Neil McMurray, Peter Douglas, and Cuncan Abbot, "Novel thick-film pH sensors based on ruthenium dioxide-glass composites," *Sensors and Actuators B*, Vol. 28, pp. 9-15, July, 1995.

[19] Wouter Olthuis, "Chemical and physical FET based sensors or variations on an equation," *Sensor and Actuator B*, Vol. 105, pp. 96-103, 2005.

[20] Yi-Hung Liao and Jung-Chuan Chou, "Preparation and characteristics of ruthenium dioxide for pH array sensors with real-time measurement system," *Sensor and Actuators B: Chem.*, Vol. 128, pp. 603-612, January, 2007.

[21] Chu-Neng Tsai, Jung-Chuan Chou, Tai-Ping Sun, and Shen-Kan Hsiung, "Study on the sensing characteristics and hysteresis effect of the tin oxide pH electrode," *Sensors and Actuators B*, Vol. 18, pp. 877-882, July, 2005.

[22] Sheng Yao, Min Wang, and Marc Madou, "A pH electrode based on melt-oxidized iridium oxide," *Journal of the Electrochemical Society*, Vol. 148, pp. 29-36, 2001.

[23] J. V. Dobson, P. R. Snodin and H. R. Thirsk, "EMF measurements of cells employing metal-metal oxide electrodes in aqueous chloride and sulphate electrolytes at temperatures between 25-250° C.," *Electrochimica Acta*, Vol. 21, pp. 527-533, 1976.

[24] T. Katsube, I. Lauks and J. N. Zemel, "pH-sensitive sputtered iridium oxide films," *Sensors and Actuators*, Vol. 2, pp. 399-410, 1981.

[25] M. F. Yuen, I. Lauks, and W. C. Dautremont-Smith, "pH dependent voltanmmetry of iridium oxide films," *Solid State Ionics*, Vol. 11, pp. 19-29, 1983.

[26] Kazusuke Yamanaka, "Anodically electrodeposited iridium oxide films (AEIROF) from alkaline solutions for electrochromic display devices," *Japanese Journal of Applied Physics*, Vol. 28, pp. 632-637, 1989.

[27] Michel A. Petit, Vincent Plichon, "Anodic electrodeposition of iridium oxide films," *Journal of Electroanalytical Chemistry*, Vol. 444, pp. 247-252, 1998.

[28] Sayed A. M. Marzouk, Stefan Ufer, Richard P. Buck, Timothy A. Johnson, Larry A. Dunlap, and Wayne E. Cascio, "Electrodeposited iridium oxide pH electrode for measurement of extracellular myocardial acidosis during acute ischemia," *Anal. Chem*, Vol. 70, pp. 5054-5061, 1998.

[29] Igor A. Ges, Borislav L. Ivanov, David K. Schaffer, Eduardo A. Lima, Andreas A. Werdich, and Franz J. Baudenbacher, "Thin-film IrOx pH microelectrode for microfluidic-based Microsystems," *Biosensors and Bioelectronics*, Vol. 21, pp. 248-256, 2005.

[30] K. Nishio, Y. Watanabe, T. Tsuchiya, "Preparation and properties of electrochromic iridium oxide thin film by sol-gel process," *Thin Solid Films*, Vol. 350, pp. 96-100, 1999.

[31] Akiyoshi Osaka, Toru Takatsuna and Yoshinari Miura, "Iridium oxide films via sol-gel processing," *Non-Crystalline Solids*, pp. 313-319, 1994.

[32] Keishi Nishio and Toshio Tsuchiya, "Electrochromic thin films prepared by sol-gel process," *Solar Energy Materials & Solar Cells*, Vol. 68, pp. 279-293, 2001.

[33] C. Jefferey Brinker, George W. Scherer, *Sol-Gel Science: The physics and Chemistry of Sol-Gel Processing*, pp. 788-798, Academic Press, Boston, 1990.

[34] Sheila A. Grant, Kerry Bettencourt, Peter Krulevitch, Julie Hamilton and Robert Glass "In vitro and in vivo measurements of fiber optic and electrochemical sensors to monitor brain tissue pH," *Sensors and Actuators*, Vol 72, pp. 174-179, January, 2001.

[35] Sayed A. M. Marzouk, Stefan Ufer, Richard P. Buck, Timothy A. Johnson, Larry A. Dunlap, and Wayne E.

Cascio, "Electrodeposited iridium oxide pH electrode for measurement of extracellular myocardial acidosis during acute ischemia," *Anal. Chem*, Vol. 70, pp. 5054-5061, 1998.

[36] Danny O'Hare, Kin H. Parker, and C. Peter Winlove, "Metal-metal oxide pH sensors for physiological application," *Medical Engineering and Physics*, Vol. 28, pp 982-988, 2006.

[37] Haley R. Clark, Timothy A. Barbari, "Modeling the response time of an in vivo glucose affinity sensor," *Biotechnol. Prog.*, Vol. 15, pp. 259-266, 1999.

[38] L. L. Visch, P. Bergveld, W. Lamprecht, and E. J.'s-Gravenmade, "pH measurement with an ion sensitive field effect transistor in the mouth of patients with xerostomia," *IEEE Transactions on biomedical engineering*, Vol. 38, pp. 353-356, 1991.

[39] Robert J. Gillies, Natrarajan Raghunand, Maria L. Garcia-Martin, and Robert A. Gatenby, "pH imaging—A review of pH measurement methods and applications in cancers," *IEEE Engineering in medicine and biology magazine*, pp. 58-64, 2004.

[40] Alan H. Auerbach, Babs R. Soller, Robert A. Peura, and Russell F. Stahl, "Hypothermia effects microsensor measurement of tissue pH," *IEEE*, pp. 830-831, 1994.

[41] Erika Kress-Rogers, "Solid-state pH sensors for food application," *Elsevier Trends Journals*, Vol. 2, pp. 320-324, 1990.

[42] Cl. Bohnke, H. Duroy, and J.-L. Fourquet, "pH sensors with lithium lanthanum titanate sensitive material: applications in food industry," *Sensors and Actuators B*, Vol. 89, pp. 240-247, 2003.

[43] Matthew F. Smiechowski, Vadim F. Lvovich, "Iridium oxide sensors for acidity and basicity detection in industrial lubricants," *Sensors and Actuators B*, Vol. 96, pp. 261-267, November, 2003.

[44] Erno Pungor, "The theory of ino-selective electrodes," *The Japan Society for Analytical Chemistry*, Vol. 14, pp. 249-256, 1998.

[45] A. W. J. Cranny, J. K. Atkinson, "Thick film silver-silver chloride reference electrodes," *Meas. Sci Technol*, pp. 1557-1565, 1998.

[46] M. Pourbaix, "Atlas of electrochemical equilibria in aqueous solutions," *National Association of Corrosion Engineers*, pp. 374-377, 1974.

[47] S. Ardizzone, A. Carugati, S. Trasatti, "Properties of thermally prepared iridium dioxide electrodes," *J. Electroanal. Cheml.*, Vol. 126, pp. 287-292, 1981.

[48] J. Hendrikese, W. Olthuis, P. Bergveld, "A method of reducing oxygen induced drift in iridium oxide pH sensor," *Sensor and Actuator*, Vol 53, pp. 97-103, November, 1998.

[49] W. Olthuis, M. A. M. Robben, P. Bergveld, M. Bos and, W. E. van der Linden, "pH sensor properties of electrochemically grown iridium oxide," *Sensor and Actuators B*, Vol. 2, pp. 247-256, 1990.

[50] H. Andreas, H. Elzanowska, I. Serebrennikova, and V. Birss, "Hydrous Ir oxide film properties at sol-gel derived Ir nanoparticles," *Journal of The Electrochemical Society*, Vol. 147, pp. 4598-4604, 2000.

[51] Fang Yue, Tan Swee Ngin, and Ge Hailin, "A novel paper pH sensor based on polypyrrole," *Sensor and Actuators B*, Vol. 32, pp. 33-39, April, 1996.

[52] Thermpon Ativanichayaphong, Shou Jiang Tang, Jianqun Wang, Wen-Ding Huang, Harry F. Tibbals, Stuart J. Spechler, J.-C. Chiao, "An Implantable, Wireless and Batteryless Impedance Sensor Capsule for Detecting Acidic and Non-Acidic Reflux," *Digestive Disease Week* 2008, San Diego, May 17-22, 2008.

[53] Lars Alexander Schneider, Andreas Korber, Stephan Grabbe, and Joachim Dissemond, "Influence of pH on wound-healing: a new perspective for wound-therapy?" *Arch Dermatol Res*, Vol. 298, pp. 413-420, 2007.

[54] Harrison D K, Walker W F, "Micro-electrode Measurement of Skin pH in Humans During Ischaemia, Hypoxia and Local Hypothermia", *Journal of Physiology*, Vol. 291, pp. 339-350, 1979.

[55] Susan Margaret Shorrock, "The exploration of tissue pH in wounds and its relationship to bacterial contamination," *Master Degree Thesis*, Worcester Polytechnic Institute, pp. 20-24, 2000.

[56] Lengheden A, and Jansson L, "pH effect on experimental wound healing of human fibroblasts in vitro," *Eur J Oral Sciences*, Vol. 103, pp. 148-155, 1995.

[57] G. Papeschi, S. Bordi, C. Beni, and L. Ventura, "Use of an iridium electrode for direct measurement of pI of proteins after isoelectric focusing in polyacrylamide gel," *Biochimica et Biophysica Acta*, Vol. 453, pp. 192-199, 1976.

[58] G. M. da Silva, S. G. Lemos, L. A. Picrifka, P. D. Marreto, A. V. Rosario, and E. C. Pereira, "Development of low-cost metal oxide pH electrodes based on the polymeric precursor method," *Analytica Chimica Acta*, Vol. 616, pp. 36-41, 2008.

[59] S. Chen and V. Thomas, "Optimization of inductive RFID technology," *IEEE International Symposium on Electronics and the Environment*, pp. 82-87, 2001.

[60] E. Haile and J. Lepkowski, "Oscillator Circuits for RTD Temperature Sensors," *Application note AN895, Microchip Technology Inc.*, 2004.

[61] "A Flexible pH Sensor Based on the Iridium Oxide Sensing Film," W.-D. Huang, H. Cao, S. Deb, M. Chiao, and J.-C. Chiao, Sensors and Actuators, A, Vol. 169, No. 1, pp. 1-11, September 2011.

The invention claimed is:

1. A method for fabricating a sol-gel based iridium oxide pH sensor comprising steps of:

forming a microfluidic mold by pouring a polymer on a patterned mold, wherein the formed microfluidic mold comprises at least one micro-dispensing channel, wherein the at least one micro-dispensing channel comprises a plurality of micro-dispensing channels;

curing the polymer to form the microfluidic mold;

forming at least one reservoir in the microfluidic mold, wherein the at least one reservoir has a pathway to the at least one micro-dispensing channel;

peeling the microfluidic mold from the patterned mold to thereby form a polymeric layer comprising the at least one reservoir and the at least one micro-dispensing channel, wherein the at least one reservoir extends through a top opening at a top wall of the polymeric layer, the at least one reservoir comprising a diameter at the top opening of the polymeric layer, wherein the diameter is sized to allow passage of a solution through the pathway to each one of the at least one micro-dispensing channels;

aligning the polymeric layer on top of a substrate comprising at least one electrode, the at least one electrode comprising at least one metal layer, wherein aligning the polymeric layer with the at least one electrode comprises aligning each one of the at least one micro-dispensing channels in the polymeric layer with each one of the at least one electrodes on the substrate such that each one of the at least one micro-dispensing channels contact each one of the at least one electrodes and a distal dispensing end of each one of the at least one micro-dispensing channels is configured to deposit the solution onto a dispensing site of each one of the at least one electrodes;

dispensing an iridium oxide sol-gel solution into the top opening of the at least one reservoir such that each one of the at least one micro-dispensing channels deposit the iridium oxide sol-gel solution onto the dispensing site of each one of the at least one electrodes to create a pH sensing electrode comprising iridium oxide;

removing the polymeric layer from the pH sensing electrode;

coating the pH sensing electrode with a photoresist layer and photolithographically creating a pattern;

depositing a second layer of metal, wherein the second layer of metal consists of a first layer of chromium and a second layer of silver; and lifting off the photoresist layer.

2. The method of claim 1, wherein the substrate is optically transparent glass.

3. The method of claim 1, wherein the at least one metal layer consists of a first layer of chromium and a second layer of gold.

4. The method of claim 3, wherein the first layer of chromium has a thickness between 15 nm and 40 nm.

5. The method of claim 3, wherein the second layer of gold has a thickness between 80 nm and 150 nm.

6. The method of claim 1, further comprising selecting at least one of a viscosity of the iridium oxide sol-gel solution and a size of the at least one micro-dispensing channel based on a desired thickness of an iridium oxide layer on the dispensing site of the at least one electrode.

7. The method of claim 1, wherein the polymer is polydimethylsiloxane.

8. The method of claim 1, wherein the pH sensing electrode has a sensitivity ranging from −71.5 mV/pH to 81.7 mV/pH.

9. The method of claim 1, wherein the dispensing site of the at least one electrode has an area of less than 100×100 $\mu m^2$.

10. The method of claim 1, wherein a sensitivity of the pH sensing electrode remains in a range of 51.0-56.1 mV/pH after three days of fabrication.

11. The method of claim 1, comprising steps of defining the at least one electrode by:
depositing the at least one metal layer on the substrate;
coating the at least one metal layer with a photoresist layer and photolithographically creating a pattern of the at least one electrode; and
etching the at least one metal layer to further define the at least one electrode.

12. The method of claim 11, wherein the photoresist layer comprises SU-8.

13. The method of claim 1, comprising:
thermally curing the pH sensing electrode; and
coating the pH sensing electrode with an encapsulation layer.

14. The method of claim 13, comprising:
opening a sensing electrode site in the encapsulation layer.

15. The method of claim 13, wherein the thermally curing comprises thermally treating the pH sensing electrode at 300° C. for up to 7 hours.

16. The method of claim 1, wherein the at least one reservoir extends through a bottom opening at a bottom wall of the polymeric layer.

17. The method of claim 16, wherein the at least one micro-dispensing channel is formed in the bottom wall of the polymeric layer.

* * * * *